(12) United States Patent
Hao et al.

(10) Patent No.: US 11,822,957 B2
(45) Date of Patent: Nov. 21, 2023

(54) TASK MIGRATION METHOD, APPARATUS, ELECTRONIC DEVICE AND STORAGE MEDIUM

(71) Applicant: BAIDU ONLINE NETWORK TECHNOLOGY (BEIJING) CO., LTD., Beijing (CN)

(72) Inventors: Haijiao Hao, Beijing (CN); Xuguang Lv, Beijing (CN); Jianxin Zhao, Beijing (CN); Linhong Liu, Beijing (CN); Hao Li, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 17/413,470

(22) PCT Filed: Sep. 2, 2020

(86) PCT No.: PCT/CN2020/113091
§ 371 (c)(1),
(2) Date: Jun. 11, 2021

(87) PCT Pub. No.: WO2021/174791
PCT Pub. Date: Sep. 10, 2021

(65) Prior Publication Data
US 2022/0398127 A1 Dec. 15, 2022

(30) Foreign Application Priority Data
Mar. 5, 2020 (CN) .......................... 202010147172.7

(51) Int. Cl.
G06F 9/48 (2006.01)
(52) U.S. Cl.
CPC .......... *G06F 9/4875* (2013.01); *G06F 9/4881* (2013.01)

(58) Field of Classification Search
None
See application file for complete search history.

(56) References Cited

U.S. PATENT DOCUMENTS

| 10,261,767 B2 | 4/2019 | Hirt et al. | |
| 11,244,244 B1 * | 2/2022 | Delgado | ........... G06F 16/24578 |

(Continued)

FOREIGN PATENT DOCUMENTS

| CN | 106294745 A | 1/2017 |
| CN | 106648674 A | 5/2017 |

(Continued)

OTHER PUBLICATIONS

International Search Report dated Dec. 2, 2020 for Application No. PCT/CN2020/113091, 5 pages.

(Continued)

*Primary Examiner* — Craig C Dorais
(74) *Attorney, Agent, or Firm* — Brooks Kushman P.C.

(57) ABSTRACT

The present disclosure provides a task migration method, apparatus, electronic device and storage medium, and relates to the technical field of data processing. The method may include: obtaining a task submitted by a user; in the case that the task is a Hadoop task and it is determined that task conversion is to be performed, converting Hadoop parameters in the task into parameters recognizable by a Spark; and injecting a conversion result into a predetermined kit and submitting the predetermined kit to a Spark cluster. The solution of the present disclosure may be applied to reduce the user's workload and enhance the processing efficiency etc.

15 Claims, 4 Drawing Sheets

(56) References Cited

U.S. PATENT DOCUMENTS

| | | |
|---|---|---|
| 2016/0098472 A1 | 4/2016 | Appleton |
| 2018/0144025 A1 | 5/2018 | Appleton |
| 2020/0159594 A1* | 5/2020 | Kyaw .................. G06F 16/278 |
| 2021/0182235 A1* | 6/2021 | Gonzalez ................ G06F 16/13 |

FOREIGN PATENT DOCUMENTS

| | | |
|---|---|---|
| CN | 106991166 A | 7/2017 |
| CN | 107526546 A | 12/2017 |
| CN | 111506399 A | 8/2020 |
| JP | 2019530121 A | 10/2019 |

OTHER PUBLICATIONS

Notice of Reasons for Refusal of Japanese patent application No. 2021-568198 dated Nov. 15, 2022, 3 pages.

Extended European Search Report of European application No. 20897630.8 dated Feb. 3, 2022, 9 pages.

Venner, "this print for content only & mdash; size & color not accurate The Apress Roadmap Beginning Google App Engine Pro Amazon EC2 and WS Beginning Scala Pro Hadoop The Definitive Guide to Terracotta", Jan. 1, 2009, XP055182281, Retrieved from the Internet: URL:http://www.wangyuxiong.com/wp-content/uploads/downloads/2013/02/Pro_Hadoop.pdf, [retrieved on Apr. 10, 2015], 425 pages.

Request for the Submission of an Opinion of Korean application No. 10-2021-7034745 dated May 2, 2023, 6 pages.

Decision of Refusal of Japanese application No. 2021-568198 dated May 1, 2023, 4 pages.

Summons to attend oral proceedings of European application No. EP20897630 dated Apr. 24, 2023, 6 pages.

\* cited by examiner

TASK MIGRATION METHOD, APPARATUS, ELECTRONIC DEVICE AND STORAGE MEDIUM

This patent application is a U.S. national phse of International Application No. PCT/CN2020/113091 filed on Sep. 2, 2020, which claims priority to Chinese patent application No. 2020101471727, filed on Mar. 5, 2020, entitled "Task Migration Method, Apparatus, Electronic Device and Storage Medium", which are hereby incorporated by reference in their entireties.

TECHNICAL FIELD

The present disclosure relates to computer application technologies, particularly to the field of data processing, and more particularly to a task migration method, electronic device and storage medium.

BACKGROUND

The computing power and performance of a Spark model is better than a Hadoop model. The Hadoop is a distributed system and performs high-speed computation and storage using the power of a cluster. The Spark is a quick, universal engine for massive data processing.

In a traditional manner, many offline tasks are compiled and run with the Hadoop model. Considering the advantage of the Spark model, it is desirable to implement the migration of the Hadoop task, i.e., convert the Hadoop task into a Spark task.

In the conventional processing manner, the conversion of the task is carried out by a developer manually, which consumes a lot of workload of the developer, and exhibits a lower efficiency.

SUMMARY

In view of the above, the present disclosure provides a task migration method, electronic device and storage medium.

A task migration method, including:
obtaining a task submitted by a user;
in the case that the task is a Hadoop task and it is determined that task conversion is to be performed, converting Hadoop parameters in the task into parameters recognizable by a Spark; and
injecting a conversion result into a predetermined kit and submitting the predetermined kit to a Spark cluster.

An electronic device, including:
at least one processor; and
a memory communicatively connected with the at least one processor; and
the memory stores instructions executable by the at least one processor, and the instructions are executed by the at least one processor to enable the at least one processor to carry out the above method.

A non-transitory computer-readable storage medium storing instructions, which, when executed by a computer, cause the computer to carry out the above method.

BRIEF DESCRIPTION OF THE DRAWINGS

The figures are intended to facilitate understanding the solutions, not to limit the present disclosure. In the figures.

DETAILED DESCRIPTION OF EMBODIMENTS

Exemplary embodiments of the present disclosure are described below with reference to the accompanying drawings, include various details of the embodiments of the present disclosure to facilitate understanding, and should be considered as being only exemplary. Therefore, those having ordinary skill in the art should recognize that various changes and modifications can be made to the embodiments described herein without departing from the scope and spirit of the application. Also, for the sake of clarity and conciseness, depictions of well-known functions and structures are omitted in the following description.

In addition, it should be appreciated that the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Figure 1:
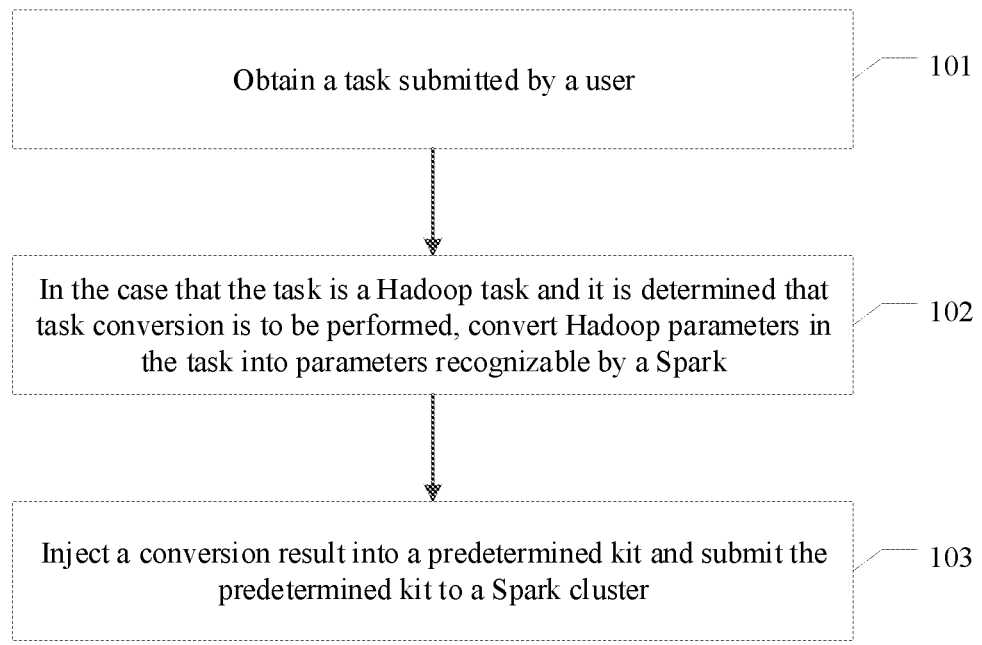
FIG. 1 illustrates a flow chart of a task migration method according to a first embodiment of the present disclosure.

FIG. 1 illustrates a flow chart of a task migration method according to a first embodiment of the present disclosure. As shown in FIG. 1, the embodiment includes the following specific implementation.

At 101, a task submitted by a user is obtained.

At 102, in the case that the task is a Hadoop task and it is determined that task conversion needs to be performed, Hadoop parameters in the task are converted into parameters recognizable by the Spark.

At 103, a conversion result is injected into a predetermined kit and submitted to a Spark cluster.

In this embodiment, after the task submitted by the user (e.g., a developer) is obtained, the type of the task may be first determined. If the task is the Hadoop task, further determination may be made as to whether to perform task conversion. In a conventional processing manner, after the user submits the Hadoop task by using a client of an offline task, the task will be directly submitted to the Hadoop cluster. In contrary, in this embodiment, the client will intercept the Hadoop task submitted by the user, and further determines whether to perform task conversion.

As an implementation, the client may obtain a configuration made by the user in advance by requesting a server, and determine whether to perform the task conversion according to the configuration. For example, it is possible to request the server to obtain a flag bit indicating whether to run the task in a Spark manner. If the flag bit indicates that the task is checked to run in the Spark manner at the management platform, it is determined the task conversion is to be performed, otherwise it is determined that the task conversion is not to be performed.

Correspondingly, if it is determined that the task conversion is to be performed, the Hadoop parameters in the Hadoop task will be converted into parameters recognizable by the Spark. That is, the client may parse the intercepted Hadoop task, and converts a Hadoop command into a Spark command A specific conversion manner may be preset, e.g., the conversion may be performed by a preset conversion rule.

Then, the conversion result may be injected into a predetermined kit, and submitted to the Spark cluster. As an implementation, the kit may be a mrtools.jar kit. The mrtools.jar kit may be taken as a Spark app, and the Spark task is submitted to the Spark cluster.

After the Spark task submitted to the Spark cluster is processed in a predetermined manner, a map and reduce process logically equivalent to the Hadoop is implemented.

Specifically, the map and reduce process logically equivalent to the Hadoop is implemented in a way that the kit reaching the Spark cluster is responsible for initializing spark context, and then goes sequentially through a hadoopStreaming operator in a map phase, a repartitionAndSortWithinPartitions operator in a shuffle phase and a hadoopStreaming operator in a reduce phase, etc. The quicker and saved computation of a Central Processing Unit (CPU) may be achieved in a way that the Spark model employs a specific memory model and Kryo serialization.

It can be seen from the above that by the method of this embodiment, the Hadoop task submitted by the user is directly converted into the Spark task so that the user may implement task migration with zero cost, thereby reducing the user's workload and enhancing the processing efficiency. Furthermore, the user may flexibly configure whether to perform task conversion according to his own needs, so that the user's different scenario needs may be satisfied. In addition, the Spark model with stronger computing power and better performance may be used to complete the map and reduce process, thereby better satisfying the user's offline computing needs.

The task submitted by the user may be, in addition to the Hadoop task, a Hadoop2Spark task indicative of a conversion from the Hadoop task to the Spark task, and the Spark task, etc.

The above introduces a processing manner when the task submitted by the user is the Hadoop task and it is determined that the task conversion is to be performed. In the case that the task submitted by the user is the Hadoop task and that it is determined that the task conversion is not to be performed, then the task may be directly submitted to the Hadoop cluster. In the case that the task submitted by the user is the Spark task, the task may be directly submitted to the Spark cluster.

In the case that the task submitted by the user is the Hadoop2Spark task, the Hadoop parameters in the task may be converted into parameters recognizable by the Spark, and the conversion result may be injected into the predetermined kit, and submitted to the Spark cluster. Since the Hadoop2Spark task is a task indicative of the conversion from the Hadoop task to the Spark task, it is unnecessary to perform the process of requesting the server to obtain the confirmation made by the user in advance and determining whether to perform the task conversion according to the configuration. As stated above, as an embodiment, the kit may be a mrtools.jar kit. The mrtools.jar kit may be taken as a Spark app, and the Spark task may be submitted to the Spark cluster. After the Spark task submitted to the Spark cluster is processed in a predetermined manner, the map and reduce process logically equivalent to the Hadoop may be implemented.

It can be seen from the above that the method according to this embodiment does not affect the processing of other tasks such as the Hadoop task and Spark task that does not require task conversion, and exhibits excellent compatibility.

Figure 2:
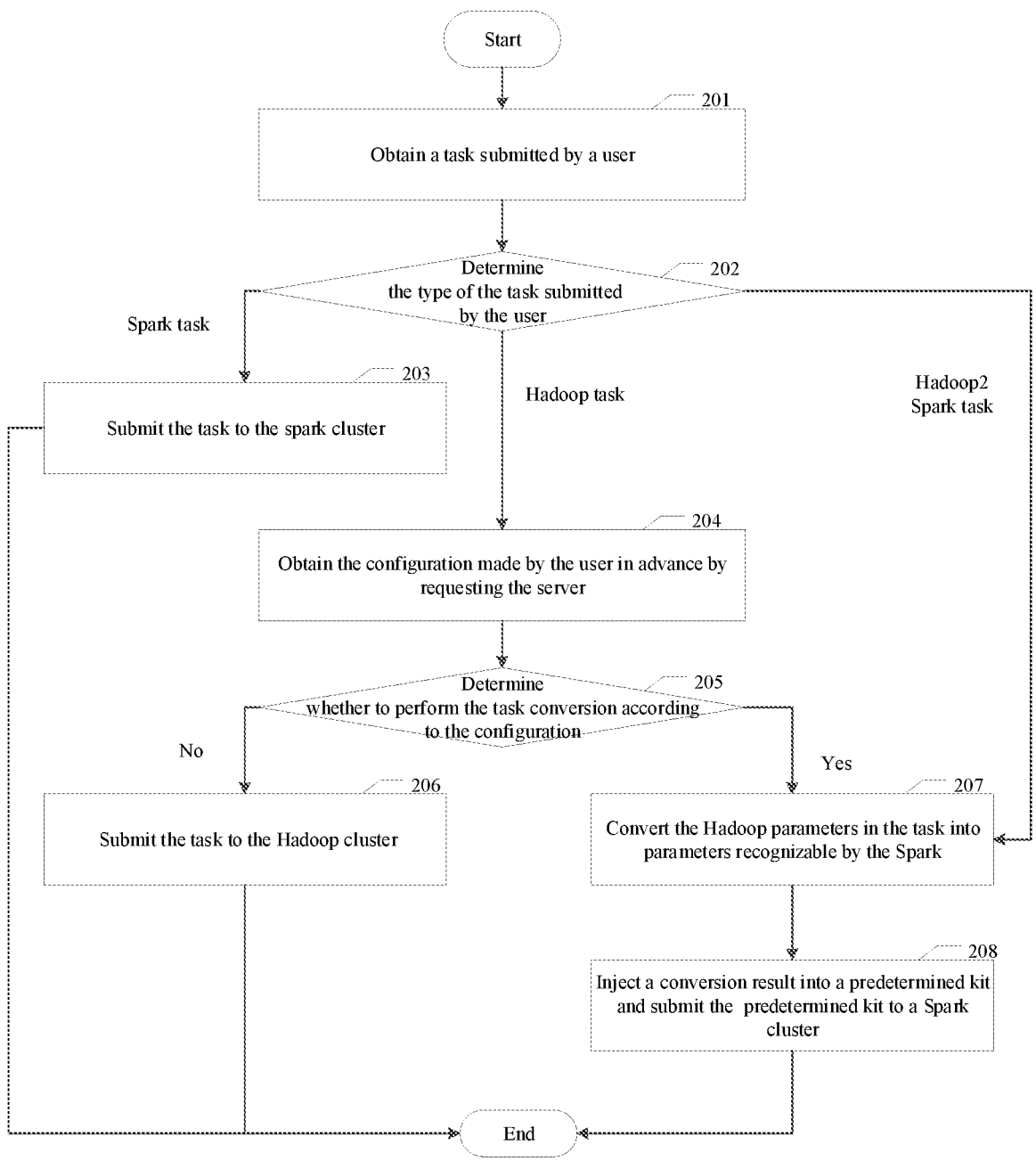
FIG. 2 illustrates a flow chart of a task migration method according to a second embodiment of the present disclosure.

On the basis of the above introduction, FIG. 2 illustrates a flow chart of a task migration method according to a second embodiment of the present disclosure. As shown in FIG. 2, the embodiment includes the following specific implementation.

At 201, a task submitted by a user is obtained.

The user may register and perform task configuration on a management platform of the server in advance, e.g., the Hadoop task may be checked on the management platform to run in the Spark manner.

In addition, the user may submit different types of tasks according to actual needs, including the Hadoop task, the Hadoop2Spark task and the Spark task, for example.

At 202, the type of the task submitted by the user is determined; in the case that the task is the Spark task, 203 will be performed; in the case that the task is the Hadoop task, 204 will be performed; and in the case that the task is the Hadoop2Spark task, 207 will be performed.

At 203, the task is submitted to the spark cluster, and the process ends.

The Spark task submitted by the user may be submitted to the Spark cluster in a conventional manner.

At 204, the configuration made by the user in advance is obtained by requesting the server.

At 205, whether to perform the task conversion is determined according to the configuration; if NO, 206 will be performed; if YES, 207 will be performed.

For example, it is possible to request the server to obtain a flag bit indicating whether to run the task in a Spark manner. If the flag bit indicates that the task is checked to run in the Spark manner at the management platform, it is determined the task conversion is to be performed, otherwise it is determined that the task conversion is not to be performed.

At 206, the task is submitted to the Hadoop cluster and then the process ends.

Regarding the Hadoop task submitted by the user, if it is determined that the task conversion is not to be performed, the task may be submitted to the Hadoop cluster in a conventional manner.

At 207, the Hadoop parameters in the task are converted into parameters recognizable by the Spark.

At 208, a conversion result is injected into a predetermined kit and submitted to a Spark cluster, and then the process ends.

The conversion result may be injected into a predetermined kit, and the Spark task is submitted to the Spark cluster. The kit may be a mrtools.jar kit. The mrtools.jar kit may be taken as a Spark app, and the Spark task may be submitted to the Spark cluster.

After the Spark task submitted to the Spark cluster is processed in a predetermined manner, the map and reduce process logically equivalent to the Hadoop may be implemented.

Figure 3:
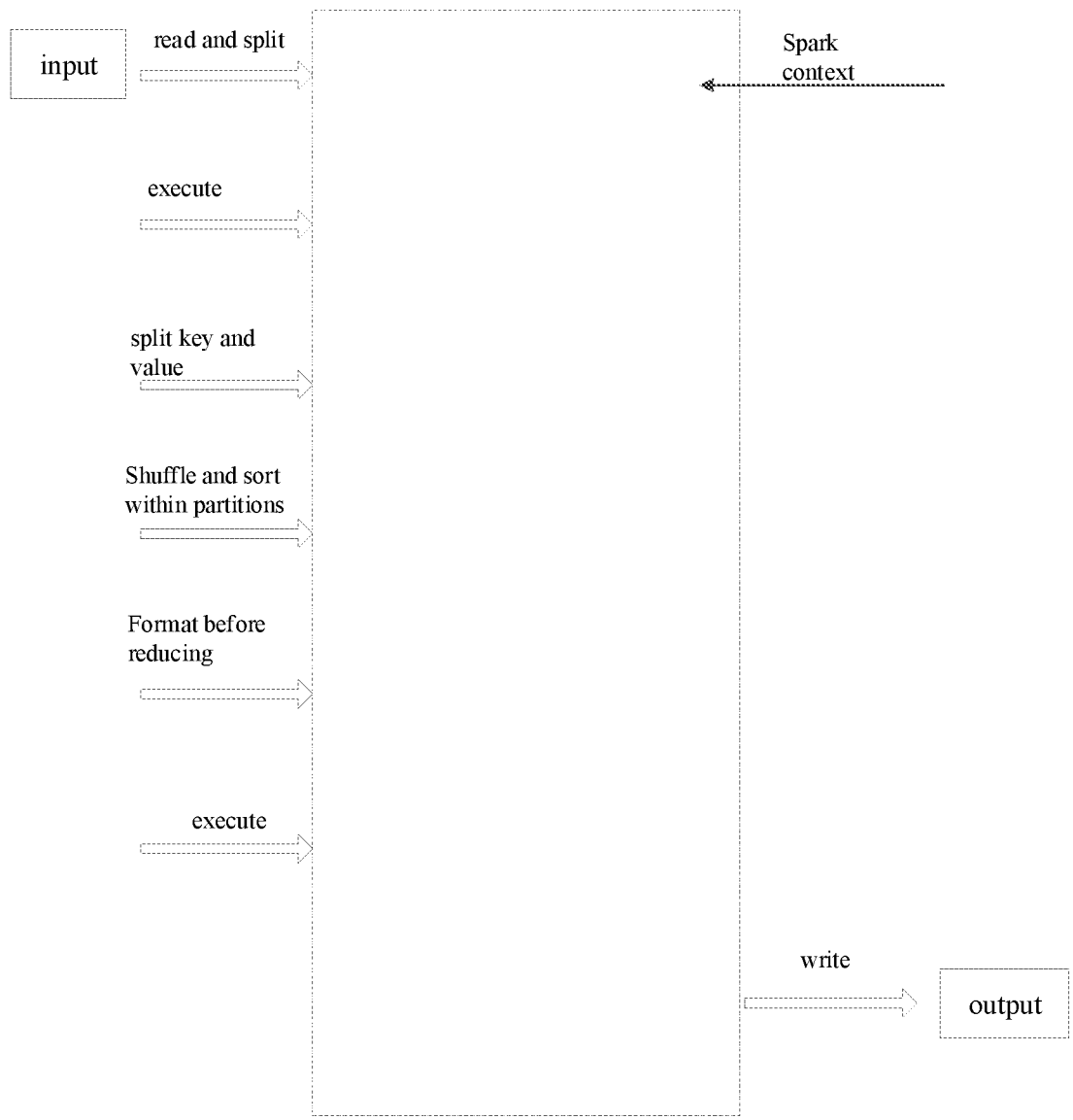
FIG. 3 illustrates a process of processing a submitted Spark task according to an embodiment of the present disclosure.

FIG. 3 illustrates a process of processing the submitted Spark task according to an embodiment of the present disclosure. As shown in FIG. 3, the kit reaching the Spark cluster is responsible for initializing spark context, then goes sequentially through a hadoopStreaming operator in a map phase, a repartitionAndSortWithinPartitions operator in a shuffle phase and a hadoopStreaming operator in a reduce phase, to implement the map and reduce process logically equivalent to the Hadoop, i.e., the output of the task is the same as the output of the task in the Hadoop cluster, and the finally-obtained result is output.

It is to be noted that, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description are exemplary embodiments, and the involved actions and modules are not necessarily requisite for the present disclosure.

In the above embodiments, embodiments are respectively described with different emphasis being placed, and reference may be made to related depictions in other embodiments for portions not detailed in a certain embodiment.

To conclude, according to the solution of the method embodiment of the present disclosure, the Hadoop task submitted by the user may be directly converted into the Spark task, so that the user may implement task migration with zero cost, thereby reducing the user's workload and enhancing the processing efficiency. Furthermore, the user may flexibly configure whether to perform task conversion according to his own needs, so that the user's different scenario needs may be satisfied. In addition, the Spark model with stronger computing power and better performance may be used to complete the map and reduce process, thereby better satisfying the user's offline computing needs. In addition, the method according to this embodiment does not affect the processing of other tasks such as the Hadoop task and Spark task that does not require task conversion, and exhibits excellent compatibility.

The method embodiments are introduced above. The solution of the present disclosure will be further described hereunder through an apparatus embodiment.

Figure 4:
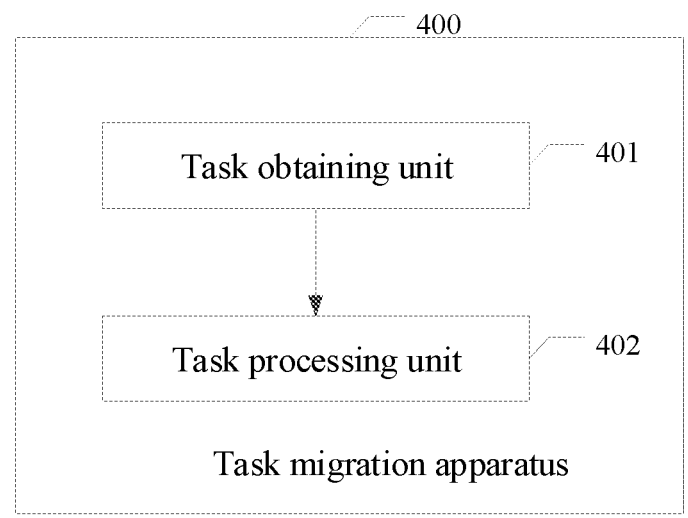
FIG. 4 illustrates a block diagram of a task migration apparatus 400 according to an embodiment of the present disclosure.

FIG. 4 illustrates a block diagram of a task migration apparatus 400 according to an embodiment of the present disclosure. As shown in FIG. 4, the task migration apparatus includes a task obtaining unit 401 and a task processing unit 402.

The task obtaining unit 401 is configured for obtaining a task submitted by a user.

The task processing unit 402 is configured for, in the case that the obtained task is a Hadoop task and it is determined that task conversion is to be performed, convert Hadoop parameters in the task into parameters recognizable by the Spark, and inject a conversion result into a predetermined kit and submit it to a Spark cluster.

As an implementation, the task processing unit 402 may obtain a configuration made by the user in advance by requesting a server, and determine whether to perform the task conversion according to the configuration. For example, it is possible to request the server to obtain a flag bit indicating whether to run the task in a Spark manner. If the flag bit indicates that the task is checked to run in the Spark manner at the management platform, it is determined the task conversion is to be performed, otherwise it is determined that the task conversion is not to be performed.

Correspondingly, if it is determined that the task conversion is to be performed, the task processing unit 402 may convert the Hadoop parameters in the Hadoop task into parameters recognizable by the Spark.

Then, the task processing unit 402 may inject the conversion result into a predetermined kit, and submit it to the Spark cluster. As an implementation, the kit may be a mrtools.jar kit. The mrtools.jar kit may be taken as a Spark app, and the Spark task may be submitted to the Spark cluster. After the Spark task submitted to the Spark cluster is processed in a predetermined manner, a map and reduce process logically equivalent to the Hadoop is implemented.

Specifically, the kit reaching the Spark cluster is responsible for initializing spark context, and then goes sequentially through a hadoopStreaming operator in a map phase, a reparitionAndSortWithinPartitions operator in a shuffle phase and a hadoopStreaming operator in a reduce phase, to implement map and reduce process logically equivalent to the Hadoop.

The task submitted by the user may be, in addition to the Hadoop task, a Hadoop2Spark task indicative of a conversion from the Hadoop task to the Spark task, and the Spark task, etc.

In the case that the task submitted by the user is the Hadoop2Spark task, the task processing unit 402 may convert the Hadoop parameters in the task into parameters recognizable by the Spark, inject the conversion result into the predetermined kit, and submit the predetermine kit to the Spark cluster.

In the case that the task submitted by the user is the Hadoop task and it is determined that the task conversion is not to be performed, the task processing unit 402 may submit the task to the Hadoop cluster. If the task submitted by the user is the Spark task, the task processing unit 402 may submit the task to the Spark cluster.

Reference may be made to corresponding depictions in the aforesaid method embodiments for a specific workflow of the apparatus embodiment shown in FIG. 4. The workflow is not detailed any more.

To conclude, according to the solution of the apparatus embodiment of the present disclosure, the Hadoop task submitted by the user may be directly converted into the Spark task, so that the user may implement task migration with zero cost, thereby reducing the user's workload and enhancing the processing efficiency etc.; furthermore, the user may flexibly configure whether to perform task conversion according to his own needs, so that the user's different scenario needs may be satisfied; in addition, the Spark model with stronger computing power and better performance may be used to complete the map and reduce process, thereby better satisfying the user's offline computing needs; in addition, the apparatus according to this embodiment does not affect the processing of other tasks such as the Hadoop task and Spark task that does not require task conversion, and exhibits excellent compatibility.

According to embodiments of the present disclosure, the present disclosure further provides an electronic device and a readable storage medium.

Figure 5:
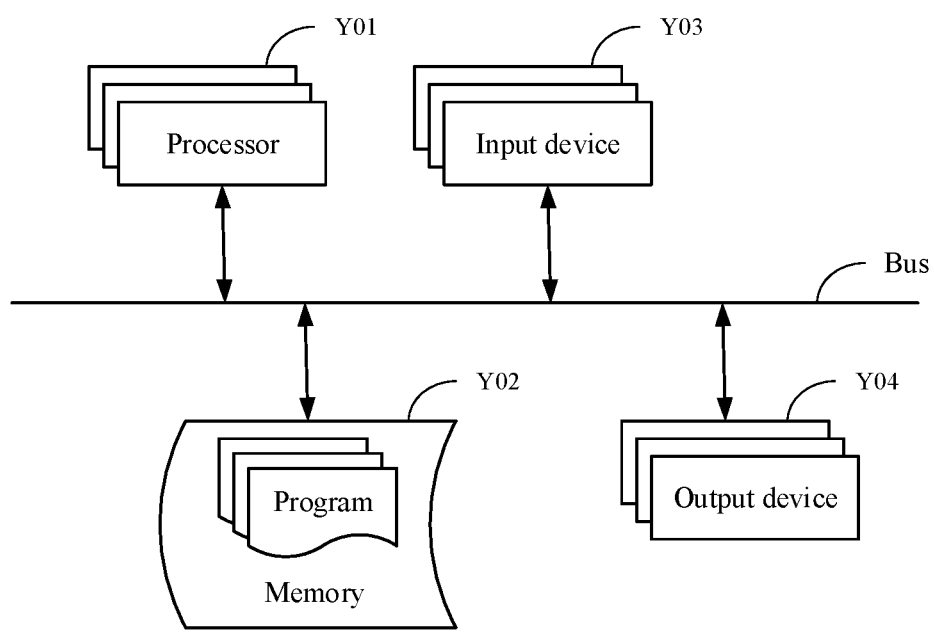
FIG. 5 illustrates a block diagram of an electronic device for implementing the method according to an embodiment of the present disclosure.

As shown in FIG. 5, it shows a block diagram of an electronic device for implementing the method according to embodiments of the present disclosure. The electronic device is intended to represent various forms of digital computers, such as laptops, desktops, workstations, personal digital assistants, servers, blade servers, mainframes, and other appropriate computers. The electronic device is further intended to represent various forms of mobile devices, such as personal digital assistants, cellular telephones, smartphones, wearable devices and other similar computing devices. The components shown here, their connections and relationships, and their functions, are meant to be exemplary only, and are not meant to limit implementations of the disclosure described and/or claimed in the text here.

As shown in FIG. 5, the electronic device includes: one or more processors 1101, a memory 1102, and interfaces configured to connect components and including a high-speed interface and a low speed interface. Each of the components are interconnected using various buses, and may be mounted on a common motherboard or in other manners as appropriate. The processor can process instructions for execution within the electronic device, including instructions stored in or on the memory to display graphical information for a GUI on an external input/output device, such as a display device coupled to the interface. In other implementations, multiple processors and/or multiple buses may be used, as appropriate, along with multiple memories and types of memory. Also, multiple electronic devices may be connected, with each device providing portions of the necessary operations (e.g., as a server bank, a group of blade servers, or a multi-processor system). One processor Y01 is taken as an example in FIG. 5.

The memory Y02 is a non-transitory computer-readable storage medium provided by the present disclosure. The memory stores instructions executable by at least one processor, so that the at least one processor executes the method according to the present disclosure. The non-transitory computer-readable storage medium of the present disclosure stores computer instructions, which are used to cause a computer to execute the method according to the present disclosure.

The memory Y02 is a non-transitory computer-readable storage medium and can be used to store non-transitory software programs, non-transitory computer executable programs and modules, such as program instructions/modules corresponding to the method in embodiments of the present disclosure. The processor Y01 executes various functional applications and data processing of the server, i.e., implements the method in the above method embodiments, by running the non-transitory software programs, instructions and modules stored in the memory 1102.

The memory Y02 may include a storage program region and a storage data region, the storage program region may store an operating system and an application program needed by at least one function; the storage data region may store data created by the use of the electronic device. In addition, the memory Y02 may include a high-speed random access memory, and may also include a non-transitory memory, such as at least one magnetic disk storage device, a flash memory device, or other non-transitory solid-state storage device. In some embodiments, the memory Y02 may optionally include a memory remotely arranged relative to the processor Y01, and these remote memories may be connected to the electronic device through a network. Examples of the above network include, but are not limited to, the Internet, an intranet, a local area network, a mobile communication network, and combinations thereof.

The electronic device may further include an input device Y03 and an output device Y04. The processor Y01, the memory Y02, the input device Y03 and the output device Y04 may be connected through a bus or in other manners. In FIG. 5, the connection through the bus is taken as an example.

The input device Y03 may receive inputted numeric or character information and generate key signal inputs related to user settings and function control of the electronic device, and may be an input device such as a touch screen, keypad, mouse, trackpad, touchpad, pointing stick, one or more mouse buttons, trackball and joystick. The output device Y04 may include a display device, an auxiliary lighting device, a haptic feedback device (for example, a vibration motor), etc. The display device may include but not limited to a Liquid Crystal Display (LCD), a Light Emitting Diode (LED) display, and a plasma display. In some embodiments, the display device may be a touch screen.

Various implementations of the systems and techniques described here may be realized in digital electronic circuitry, integrated circuitry, specially designed ASICs (Application Specific Integrated Circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to send data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a proxies component (e.g., an application server), or that includes a front end component (e.g., a client computer having a graphical user interface or a Web browser through which a user may interact with an implementation of the systems and techniques described here), or any combination of such back end, proxies, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

It should be understood that the various forms of processes shown above can be used to reorder, add, or delete steps. For example, the steps described in the present disclosure can be performed in parallel, sequentially, or in different orders as long as the desired results of the technical solutions disclosed in the present disclosure can be achieved, which is not limited herein.

The foregoing specific implementations do not constitute a limitation on the protection scope of the present disclosure. It should be understood by those skilled in the art that various modifications, combinations, sub-combinations and substitutions can be made according to design requirements and other factors. Any modification, equivalent replacement and improvement made within the spirit and principle of the present disclosure shall be included in the protection scope of the present disclosure.

What is claimed is:

1. A task migration method, comprising:
obtaining a task submitted by a user;
in a case that the task is a Hadoop task and it is determined that task conversion is to be performed, converting Hadoop parameters in the task into parameters recognizable by a Spark; and
injecting a conversion result into a predetermined kit and submitting the predetermined kit to a Spark cluster.

2. The method according to claim 1, wherein determining that task conversion is to be performed comprises:
obtaining a configuration made by the user in advance by requesting a server; and
determining whether to perform the task conversion according to the configuration.

3. The method according to claim 1, further comprising:
in the case that the task is a Hadoop2Spark task indicating a conversion from the Hadoop task to a Spark task, converting the Hadoop parameters in the task into the parameters recognizable by the Spark; and
injecting the conversion result into the predetermined kit, and submitting the predetermined kit to the Spark cluster.

4. The method according to claim 1, further comprising:
in the case that the task is the Hadoop task and it is determined that the task conversion is not to be performed, submitting the task to a Hadoop cluster; and
in the case that the task is a Spark task, submitting the task to the Spark cluster.

5. The method according to claim 1, wherein the injecting the conversion result into the predetermined kit and submitting the predetermined kit to the Spark cluster comprises:
injecting the conversion result into the predetermined kit, and submitting a spark task to the Spark cluster;
wherein, after the Spark task is processed in a predetermined manner, a map and reduce process logically equivalent to the Hadoop is implemented.

6. An electronic device, comprising:
at least one processor; and
a memory communicatively connected with the at least one processor; wherein,
the memory stores instructions executable by the at least one processor, and the instructions are executed by the at least one processor to cause the at least one processor to carry out a task migration method, which comprises:
obtaining a task submitted by a user;
in a case that the task is a Hadoop task and it is determined that task conversion is to be performed, converting Hadoop parameters in the task into parameters recognizable by a Spark; and
injecting a conversion result into a predetermined kit and submitting the predetermined kit to a Spark cluster.

7. A non-transitory computer-readable storage medium storing instructions, which, when executed by a computer, cause the computer to carry out a task migration method, which comprises:
obtaining a task submitted by a user;
in a case that the task is a Hadoop task and it is determined that task conversion is to be performed, converting Hadoop parameters in the task into parameters recognizable by a Spark; and
injecting a conversion result into a predetermined kit and submitting the predetermined kit to a Spark cluster.

8. The non-transitory computer-readable storage medium according to claim 7, wherein determining that task conversion is to be performed comprises:
obtaining a configuration made by the user in advance by requesting a server; and
determining whether to perform the task conversion according to the configuration.

9. The non-transitory computer-readable storage medium according to claim 7, wherein the method further comprises:
in the case that the task is a Hadoop2Spark task indicating a conversion from the Hadoop task to a Spark task, converting the Hadoop parameters in the task into the parameters recognizable by the Spark; and
injecting the conversion result into the predetermined kit, and submitting the predetermined kit to the Spark cluster.

10. The non-transitory computer-readable storage medium according to claim 7, wherein the method further comprises:
in the case that the task is the Hadoop task and it is determined that the task conversion is not to be performed, submitting the task to a Hadoop cluster; and
in the case that the task is a Spark task, submitting the task to the Spark cluster.

11. The non-transitory computer-readable storage medium according to claim 8, wherein the injecting the conversion result into the predetermined kit and submitting the predetermined kit to the Spark cluster comprises:
injecting the conversion result into the predetermined kit, and submitting a spark task to the Spark cluster;
wherein, after the Spark task is processed in a predetermined manner, a map and reduce process logically equivalent to the Hadoop is implemented.

12. The electronic device according to claim 6, wherein determining that task conversion is to be performed comprises:
obtaining a configuration made by the user in advance by requesting a server; and
determining whether to perform the task conversion according to the configuration.

13. The electronic device according to claim 6, wherein the method further comprises:
in the case that the task is a Hadoop2Spark task indicating a conversion from the Hadoop task to a Spark task, converting the Hadoop parameters in the task into the parameters recognizable by the Spark; and
injecting the conversion result into the predetermined kit, and submitting the predetermined kit to the Spark cluster.

14. The electronic device according to claim 6, wherein the method further comprises:
in the case that the task is the Hadoop task and it is determined that the task conversion is not to be performed, submitting the task to a Hadoop cluster; and
in the case that the task is a Spark task, submitting the task to the Spark cluster.

15. The electronic device according to claim 6, wherein the injecting the conversion result into the predetermined kit and submitting the predetermined kit to the Spark cluster comprises:

injecting the conversion result into the predetermined kit, and submitting a spark task to the Spark cluster;

wherein, after the Spark task is processed in a predetermined manner, a map and reduce process logically equivalent to the Hadoop is implemented.

\* \* \* \* \*